(12) United States Patent
Arkhipenkov et al.

(10) Patent No.: US 9,667,085 B2
(45) Date of Patent: May 30, 2017

(54) WIRELESS CHARGER FOR ELECTRONIC DEVICE

(71) Applicant: Samsung Electronics Co., Ltd., Gyeonggi-do (KR)

(72) Inventors: Vladimir Yakovlevich Arkhipenkov, Moscow region (RU); Alexander Nikolaevich Khripkov, Moscow region (RU); Joon-Il Kim, Seoul (KR); Konstantin Alexandrovich Pavlov, Moscow (RU); Mikhail Nikolaevich Makurin, Arkhangelsk (RU); Nikolay Nikolaevich Olyunin, Perm (RU)

(73) Assignee: Samsung Electronics Co., Ltd (KR)

( * ) Notice: Subject to any disclaimer, the term of this patent is extended or adjusted under 35 U.S.C. 154(b) by 134 days.

(21) Appl. No.: 14/307,013

(22) Filed: Jun. 17, 2014

(65) Prior Publication Data

US 2014/0375258 A1    Dec. 25, 2014

(30) Foreign Application Priority Data

Jun. 19, 2013   (RU) .................................. 2013127771
Nov. 8, 2013    (KR) ......................... 10-2013-0135556

(51) Int. Cl.
*H02J 7/00*     (2006.01)
*H02J 7/02*     (2016.01)
*H02J 5/00*     (2016.01)

(52) U.S. Cl.
CPC .............. *H02J 7/025* (2013.01); *H02J 5/005* (2013.01); *H02J 7/0027* (2013.01); *H02J 7/0044* (2013.01)

(58) Field of Classification Search
USPC ........................................................ 320/108
See application file for complete search history.

(56) References Cited

U.S. PATENT DOCUMENTS

| | | | |
|---|---|---|---|
| 7,948,208 | B2 | 5/2011 | Partovi et al. |
| 7,952,322 | B2 | 5/2011 | Partovi et al. |
| 8,076,801 | B2 | 12/2011 | Karalis et al. |
| 8,102,147 | B2 | 1/2012 | Jung |
| 8,299,652 | B2 | 10/2012 | Sample et al. |
| 8,304,935 | B2 | 11/2012 | Karalis et al. |
| 2011/0046438 | A1 | 2/2011 | Iwaisako et al. |
| 2011/0062914 | A1 | 3/2011 | Park et al. |

(Continued)

FOREIGN PATENT DOCUMENTS

| | | |
|---|---|---|
| RU | 2481689 | 5/2013 |
| RU | 2481704 | 5/2013 |
| RU | 2481705 | 5/2013 |

*Primary Examiner* — Mohammed Alam
(74) *Attorney, Agent, or Firm* — The Farrell Law Firm, P.C.

(57) ABSTRACT

A wireless charger for an electronic device is provided, which includes one or more charge cells formed by one or more structures of transmitting inductance coils, each of the charge cells receiving an electronic device, and an electric power supply circuit of transmitting coils. The transmitting coils surround the charge cells on at least two sides, respectively, and generate a uniformly distributed magnetic field such that the magnetic fields, generated by currents in parts of the structure of the transmitting coils, are mutually subtracted out of the charge cells and summarized inside the charge cell in an area in which the electronic device for reception of energy is located.

17 Claims, 7 Drawing Sheets

(56) References Cited

U.S. PATENT DOCUMENTS

| | | | |
|---|---|---|---|
| 2011/0210621 A1 | 9/2011 | Iwaisako et al. | |
| 2011/0221385 A1 | 9/2011 | Partovi et al. | |
| 2013/0119773 A1* | 5/2013 | Davis | H02J 5/005 307/104 |
| 2014/0002012 A1* | 1/2014 | McCauley | H02J 7/025 320/108 |
| 2014/0091756 A1* | 4/2014 | Ofstein | H02J 5/005 320/108 |
| 2014/0292100 A1* | 10/2014 | Lee | H01F 38/14 307/104 |
| 2015/0222129 A1* | 8/2015 | McCauley | H02J 5/005 307/104 |
| 2015/0326061 A1* | 11/2015 | Davison | H02J 7/025 320/108 |

* cited by examiner

WIRELESS CHARGER FOR ELECTRONIC DEVICE

PRIORITY

The present application claims priority under 35 U.S.C. §119(a) to Korean Patent Application Serial No. 10-2013-0135556, filed on Nov. 8, 2013 in the Korean Intellectual Property Office, and Russian Federation Patent Application Serial No. 2013127771, filed on Jun. 19, 2013 in Russian Federation Patent Office, the entire disclosures of each of which are incorporated herein by reference.

BACKGROUND

1. Field of the Invention

The present invention generally relates to electronic devices including mobile devices, and more particularly, to wireless charger and devices for wireless energy transfer, for example, to an electronic device.

2. Description of the Related Art

Systems for transfer of electromagnetic energy may be classified into radiating and non-radiating systems. Radiating systems for transfer of energy are based on narrow-band transmitters and use electromagnetic radiation in a far-field region. Non-radiating systems for a transfer of energy are based as a rule on electromagnetic induction and use an evanescent field in a near-field region.

The resonance inductive method of a wireless transfer of energy is based on a following principle: inductance coils with identical own resonance frequencies form the resonance system interchanging energy through a magnetic field.

An electronic device, charged by a wireless method, contains a built-in receiving coil which is sometimes called the energy receiver. The electronic device is charged at allocation over the transmitting coil of a wireless charger which is sometimes called the energy transmitter. The induced electromotive force is created in the receiving coil due to the magnet field generated by the transmitting coil. The effective transfer of energy to one or several electronic devices simultaneously causes the necessity of increasing of the dimension of the transmitting coil or use of a large number of transmitting coils. The increasing of the dimension of the transmitting coils increases the level of spurious electromagnetic radiation and complicates providing of uniform efficiency of a transfer of energy by a surface of a charger. This causes difficulty in the application of prior-art wireless technologies of transfer of the electric power for charging of electronic devices such as mobile devices and other household appliances.

SUMMARY

The present invention has been made to address at least the above-mentioned disadvantages and problems, and to provide at least the advantages described below. Accordingly, an aspect of the present invention provides a wireless charger for various mobile devices, which are supplied with accumulators, different by a lowered radiation in a far-field region, no spurious electromagnetic interference, and the random position of charged mobile devices.

According to an aspect of the present invention, a wireless charger for an electronic device is provided, which includes one or more charge cells formed by one or more structures of transmitting inductance coils, each of the charge cells receiving an electronic device, and an electric power supply circuit of transmitting coils, the transmitting coils surrounding the charge cells on at least two sides, respectively, and generating a uniformly distributed magnetic field such that the magnetic fields, generated by currents in parts of the structure of the transmitting coils, are mutually subtracted out of the charge cells and summarized inside the charge cell in an area in which the electronic device for reception of energy is located.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1A:
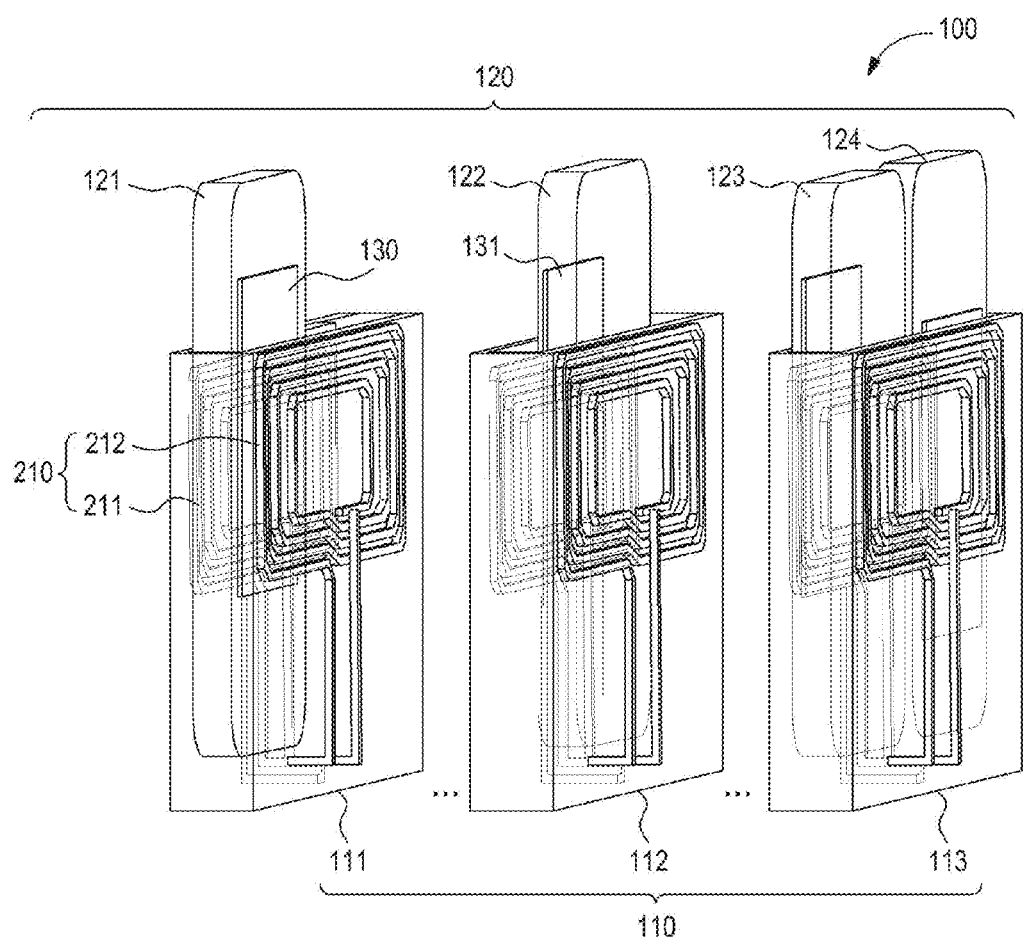
FIG. 1A is a schematic perspective view illustrating a system of wireless multi-position charging of electronic devices according to an embodiment of the present invention, in which simplified structures of transmitting coils are shown.

Hereinafter, various embodiments of the present invention will be described in detail with reference to the accompanying drawings. In the following description, when it is determined that a detailed description of related known functions or structures causes confusion in the subject matter of the present invention, the description thereof will be omitted. In addition, terms described below are defined in consideration of functions in the embodiment, but they may be replaced with other terms according to intention of a user or an operator, or a practice. Therefore, the terms will be defined more definitely through the description of the various embodiments of the present invention. Further, use of an ordinal number such as first and second is to distinguish objects having identical names from one another, and an order of the objects may be determined arbitrarily.

In an embodiment of the present invention, the system includes a first part which is the charger. It includes a set of structures of the transmitting coils forming a set of cells of a charger. Devices for reception of energy during wireless charging are located in these cells. Each cell of the charger is surrounded by structure of the transmitting coil not less than on two sides so that the amplitude of density of a magnetic stream is a maximum between devices for reception of the energy, placed in the cell, and corresponding parts of structure of the transmitting coil. Each mobile device is placed so that its receiving coil is in one of cells of a charger and has been connected to the structure of the transmitting coil. In this case, each receiving coil is localized in area with an intensive stream of the magnetic field excited by corresponding structure of the transmitting coil.

The second part of system is the device for reception of energy, capable of receiving the electrical feed or to be charged by means of the receiving coil. When the device for reception of energy is placed in a charger cell, the receiving coil and corresponding structure of the transmitting coil are connected by the magnetic stream passing through both coils. Thus, the magnetic flux, generated by the structure of the transmitting coil, induces a current in the receiving coil, and energy is transmitted to the device for reception of energy. The device for reception of energy contains a rectifier, connected to the receiving coil, and the electric power supplying circuit, switching on a circuit for charging an accumulator.

In one embodiment, the charger comprises a built-in power supply for excitation of a magnetic field by means of the set of structures of transmitting coils.

In another embodiment, the set of structures of the transmitting coils receives energy by means of a unit for matching of the transmitter connected to corresponding structures of the transmitting coils. The matching unit of the transmitter provides a power distribution and matching of impedance for each structure of the transmitting coil. According to an embodiment, the matching unit for power distribution and impedance matching includes following components: the power supply, having one or more radio-frequency power generators, matching units of the transmitter and switches. These components determine a current density and direction of current in each structure of the transmitting coil, and hence they determine distribution density of a generated magnetic stream and number of active cells of a charger.

According to another embodiment, each structure of the transmitting coil receives energy from a corresponding electric power supplying circuit.

Figure 1B:
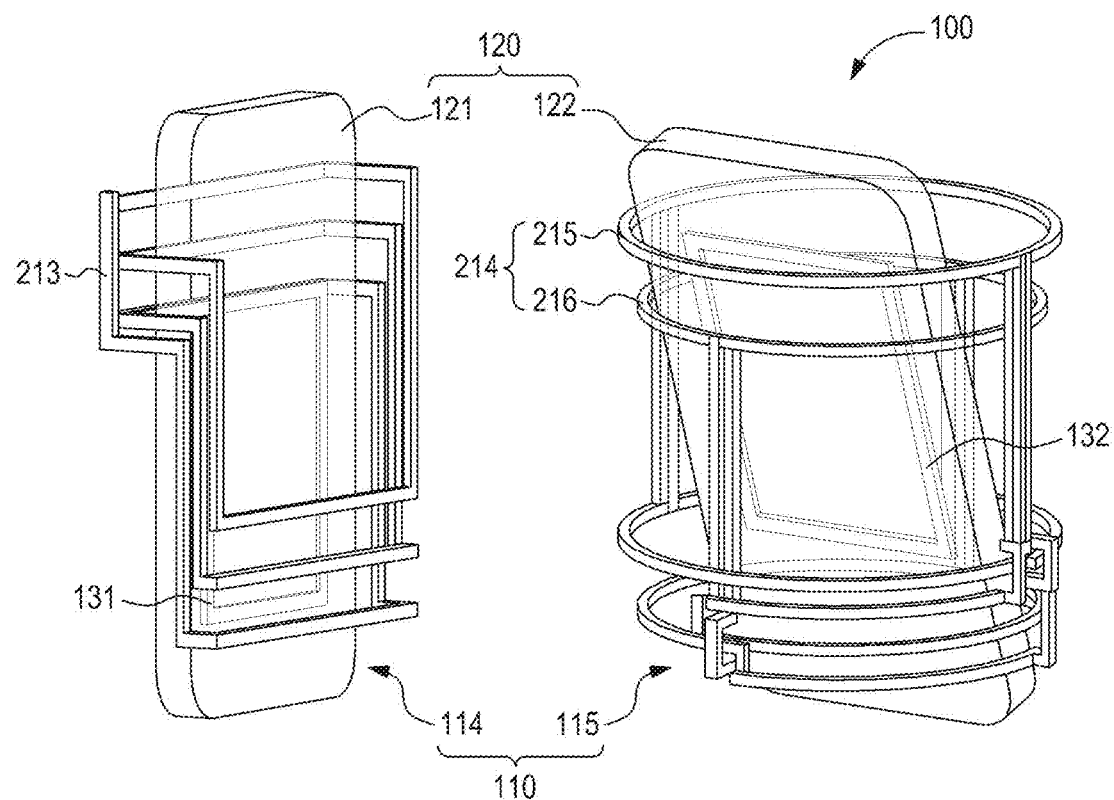
FIG. 1B is a schematic perspective view illustrating a system of wireless multi-position charging of electronic devices according to another embodiment of the present invention, in which simplified structures of transmitting coils are shown.

FIG. 1A is a schematic perspective view illustrating a system 100 using electromagnetic induction according to an embodiment of the present invention, in which external views of the system are variously shown, and FIG. 1B is a schematic perspective view illustrating a system 100 using electromagnetic induction according to another embodiment of the present invention, in which external views of the system are variously shown.

The system 100 includes a wireless charger 110 and several devices 120 for reception of energy, for example, electronic devices such as mobile devices. The charger 110 includes several charge cells 111, 112, 113, 114 and 115. Each device 121, 122, 123 and 124 for reception of energy includes a accumulator and means for wireless charging, or operates by directly receiving energy from the charger 110.

The accumulator, such as lithium-ion battery, lithium-polymer battery or other types of battery, is mounted and charged in the device 120 for reception of energy. The charger 110 is supplied with electric energy from an external power supply source and generates a magnetic field for a wireless charging of the accumulator of the device 120 for reception of energy. As shown in FIG. 1A, the charger 110 is established in the form of a number of vertical parallel charge cells 111, 112 and 113, intended to receive devices 120. Nevertheless, the charger 110 can take a shape different from the charge cell 111, 112 and 113, for example, shapes as shown in FIG. 1B. The charger 110 includes a set of structures of the transmitting coils 210, 213 and 214, and each device 120 for reception of energy includes a receiving coil 130.

Each device 120 for reception of energy includes a shield surface 131, 132, isolating one side of the receiving coil 130 from the magnetic field, generated by a corresponding structure of the transmitting coil 210, 213 and 214. The shield surface 131, 132 may consist of a ferrite thin film, an artificial magnetic-conductive material, an electric-conductive material, or their combination.

According to the embodiment, as shown in FIG. 1A, each charge cell 111, 112 or 113 has two sides surrounded by the structure of the transmitting coil 210 consisting of two parts 211 and 212, which are arranged in parallel. The currents, flowing in parts 211 and 212 of the structure of the transmitting coil 210, are directed so that the magnetic fields, generated by the structure of the transmitting coil 210, are mutually subtracted in all points in space except for the position of devices 120 in the charger 110.

According to the embodiment, as shown in FIG. 1B, each charge cell 114 or 115 is surrounded by the structure of the transmitting coil 213 and 214, respectively. At least one of the transmitting coil 213, 214, for example, the transmitting coil 214, consists of two ring-shaped parts 215, 216, which are arranged in parallel. The current, flowing in parts 215, 216 of the structure of the transmitting coil 214, are directed so that the magnetic fields, generated by the structure of the transmitting coil 214, are mutually subtracted in all points in space except for the position of devices 120 in the charger 110.

Figure 2:
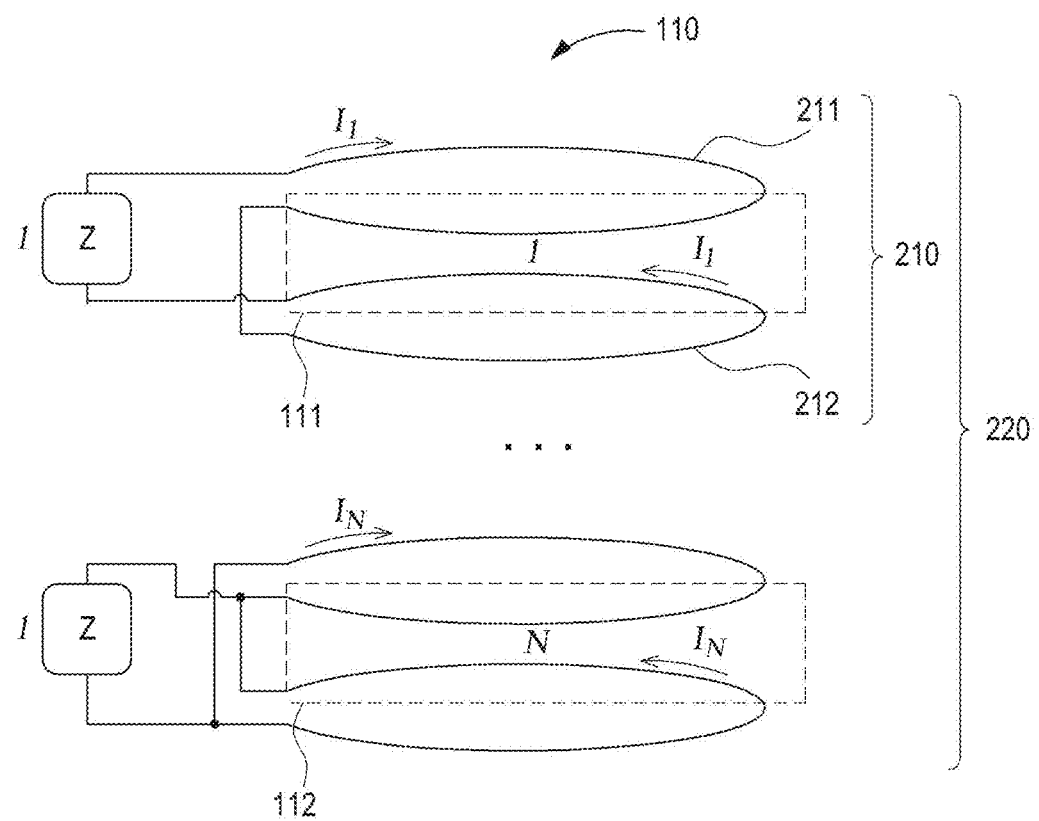
FIG. 2 illustrates a scheme of allocation of a set of structures of the transmitting coils forming cells of a charger, in which the effective wireless transfer of energy is possible and parts of structures of transmitting coils are connected serially and in parallel.

FIG. 2 shows a scheme of allocation of a set 220 of structures of transmitting coils 210 and charge cells 111 and 112 of the charger 110. The effective wireless transfer of energy is possible in charge cells 111 and 112. Each structure of the transmitting coil 210 consists of parts 211 and 212 surrounding the charge cell 111 on at least two sides. In this case, the amplitude of density of a magnetic stream is a maximum between device 120 for reception of energy, placed in the cell 111, and the corresponding part 211 or 212 of structure of the transmitting coil 210. Thus, the devices 120 of reception of energy, placed in charge cells 111, 112, are provided with the electrical feed or charged by a wireless method.

Figure 3:
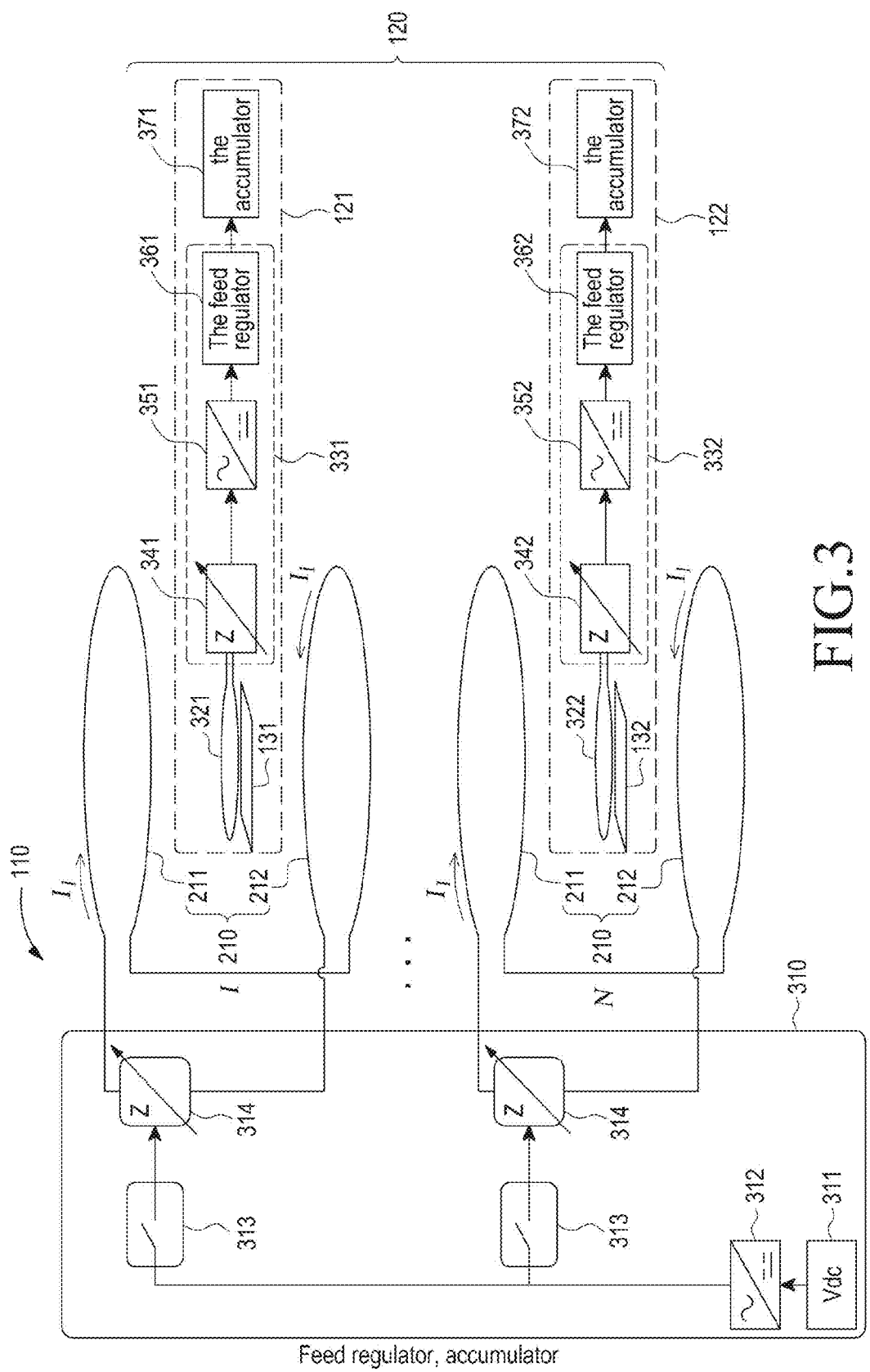
FIG. 3 is a circuit diagram illustrating connections of an electric power supplying circuit to a set of structures of transmitting coils and connections of the receiving coil to the charge circuit and to the accumulator.

FIG. 3 illustrates a circuit diagram of a connection of the electric power supplying circuit to a set of structures of transmitting coils 210 and a connection of the receiving coil 321 (322) to the charge circuit 331 (332) and the accumulator 371 (372). According to the embodiment, the charger 110 includes the electric power supplying circuit 310, connected to a set of structures of transmitting coils 210 and, thus, determines intensity and spatial distribution of generated magnetic field.

According to the embodiment, the electric power supplying circuit 310 includes power supply 311, the radio-frequency power generator 312, the switch 313 and the matching unit 314 of the transmitter. The electric power supplying circuit 310 is used for distribution of energy and impedance matching in the set of structures of transmitting coils 210.

Power supply 311 supplies the radio-frequency power generator 312 with electric power by direct current voltage. The radio-frequency power generator 312 generates an alternating current and applies it as an input to matching units 314 of the transmitter by means of switches 313.

In another embodiment, there are no switches 313 in the electric power supplying circuit 310. In this case, one or more radio-frequency power generators 312 are connected to inputs of matching units 314 of the transmitter.

As shown in FIG. 3, the lattice from N structures of transmitting coils 210 is supplied with alternating current from N matching units 314 of the transmitter. Matching units 314 of the transmitter provide power distribution and matching of impedance for each of the structures of transmitting coils 210.

Charge cells 111 and 112 (see FIG. 2) are formed in a volume between structural parts 211 and 212 of the transmitting coil 210. Each of devices 121 and 122 for reception of energy is placed so that a corresponding receiving coil 321 (322) (see FIG. 3) is connected by a magnetic field to a corresponding structure of the transmitting coil 210 in one of charge cells 111 and 112. In this case, the receiving coils 321 and 322 are located in an area of the intensive magnetic stream generated by one of the structures of the transmitting coil 210.

As shown in FIG. 3, the device 121 (122) for reception of energy includes the receiving coil 321 (322), the charge circuit 331 (332) and the accumulator 371 (372). The receiving coil 321 (322) is inductively connected to the corresponding structure of the transmitting coil 210. Thus, the magnetic field, generated by the structure of the transmitting coil 210, induces a current in the receiving coil 321 (322). The charge circuit 331 (332) is intended for charging of the accumulator 371 (372) by means of the energy received by the receiving coil 321 (322).

In the above description, the term "charge circuit" may be interpreted as "electric power supplying circuit" for charging the accumulator 371 (372) and for directly supplying electricity to the device 121 (122) for reception of energy.

According to the embodiment, the charge circuit 331 (332) supplies electricity to the device 121 (122) for reception of energy, or charges the corresponding accumulator 371 (372), or performs both actions simultaneously. The charge circuit 331 (332) includes any suitable components. The energy, received by the receiving coil 321 (322) from the corresponding structure of the transmitting coil 210, is input to the rectifier 351 (352) by means of the matching unit 341 (342) of the receiver. The rectifier 351 (352) is connected to a feed regulator 361 (362). The feed regulator 361 (362) performs various functions, including constant-voltage regulation for a supply of electricity to the device 121 (122) for reception of energy, and measurement of parameters of the accumulator 371 (372) (voltage, current, power). The required mode of charging of the accumulator 371 (372) is programmed in the feed regulator 361 (362). These functions are performed based on correct current regulation on an output of the rectifier 351 (352), in the structures of the receiving coil 321 (322) and the transmitting coil 210.

According to the embodiment, one or more devices 120 for reception of energy may be placed in the charger 110 in one or more charge cells 111 and 112 (see FIGS. 1A and 1B). The charger 110 recognizes a position of each of the devices 120 for reception of energy according to one of listed algorithms below for implementation of the automatic detection.

In some embodiments, the charger 110 and device 120 for reception of energy (see FIGS. 1A and 1B) are connected with each other for data transmission. The methods, used in communication networks, such as Radio Frequency IDentification (RFID), Near Field Communication (NFC), Bluetooth, Bluetooth Low-Energy (BLE), Zig-Bee, 2.4 GHz Ant+ and any other mode of data transmission, are applicable for the automatic detection of devices 120 for reception of energy.

According to the embodiment, various types of antennas are applicable for the transceiver of the data between the charger 110 and one or more devices 120 for reception of energy (see FIGS. 1A and 1B). This is intended for data transmission about the presence of the device 120, its identification data and parameters of accumulator capacity, and charging mode.

In some embodiments, the antennas may be integrated with the structures of transmitting coils 210 and the receiving coils 321 (322) (see FIG. 3). In other embodiments, the antennas of data transmission may be applied separately from coils of a wireless transfer of energy.

According to the present invention, the algorithm for the automatic detection is used for detection of a position of one or more devices 120 for reception of energy. In some embodiments, the algorithm operates as follows. In a non-loaded mode, the charger 110 implements the lowered energy consumption. Transmitting coils 210 momentarily transmit energy for activation of the devices 120 for reception of energy at a predetermined time intervals. Then, the charger 110 expects a return signal from devices 120 of which are located in corresponding active charge cells 111 and 112. After detection of one or more devices 120, the charger 110 starts data exchange with each of them. The message may include an identification code checked by using compatibility of cells 110 and devices 120, the power level required for each device 120 for reception of energy, and characteristics of required modes of energy transmission for each device.

In another embodiment, there is no necessity for data communication between one or more devices 120 for reception of energy and the charger 110. In some embodiments, the charger 110 detects the presence of the device 120 by detection of changes in a status of the electric power supplying circuit 310 of some transmitting coils 210 when the device 120 for reception of energy is located in one of the charge cells 111 and 112. In other embodiments, the presence of the device 120 for reception of energy is detected by means of a series of sensors, such as a capacitor, a magnetic sensor, an optical sensor or other sensors, capable to detect the presence of devices 120 in charge cells 111.

After detection of the device 120 for reception of energy, the charger 110 activates the corresponding structure of the transmitting coil 210 for redistribution of the magnetic field and implementation of a wireless transfer of energy through corresponding charge cells 111 and 112 in the corresponding receiving coil 321 (322) and hence in the charge circuit 331 (332).

Matching units 314 of the transmitter provide matching of an impedance of an output of the radio-frequency power generator 312 with each transmitting coil. Densities of currents in each coil are determined by an impedance of the corresponding matching unit 314 of the transmitter and the statuses of switches 313.

Figure 4A:
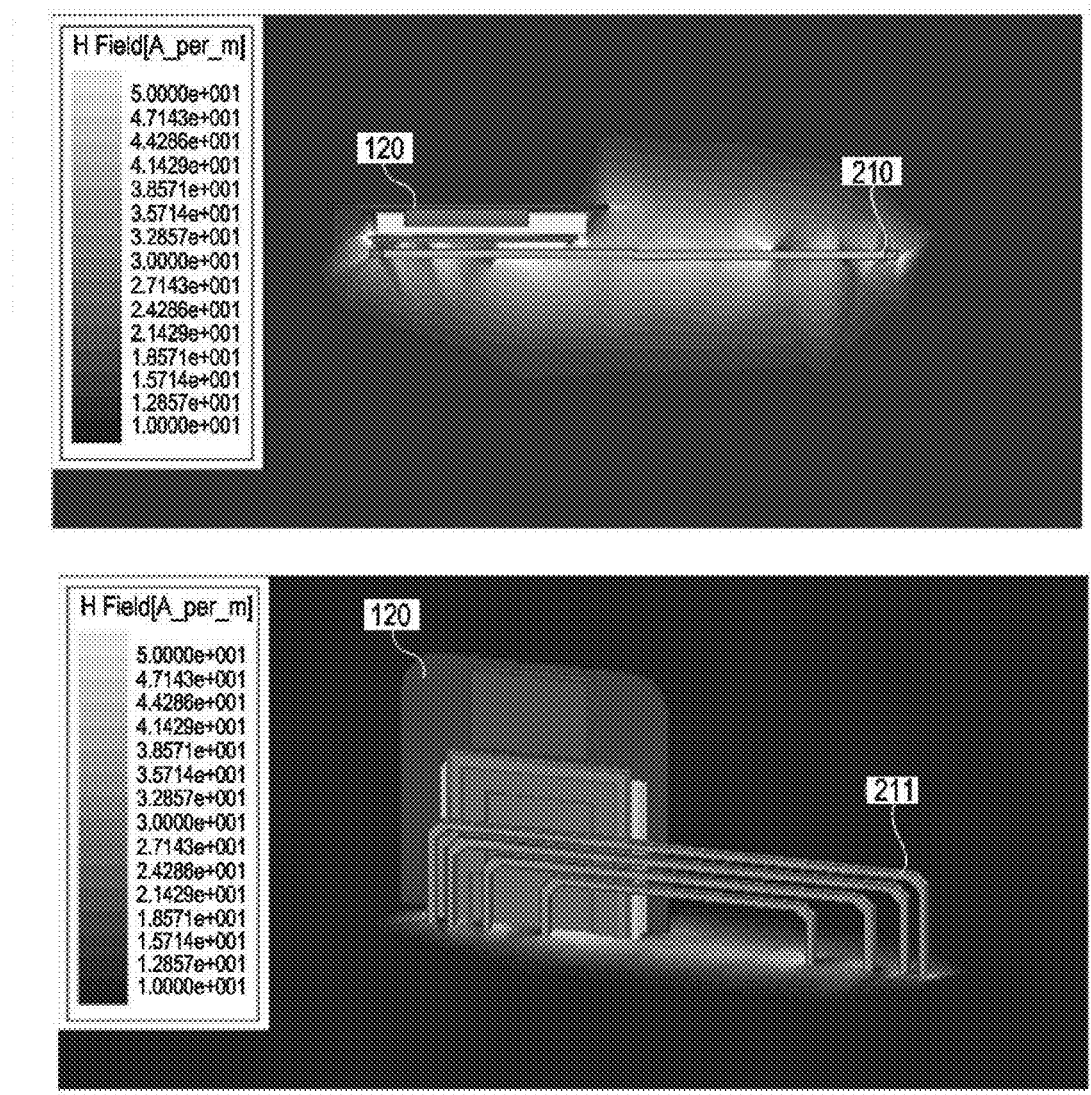
FIG. 4A is a view illustrating a distribution of the magnetic field generated by various configurations of the structure of the transmitting coil, in which the transmitting coil is arranged in a planar structure.
Figure 4B:
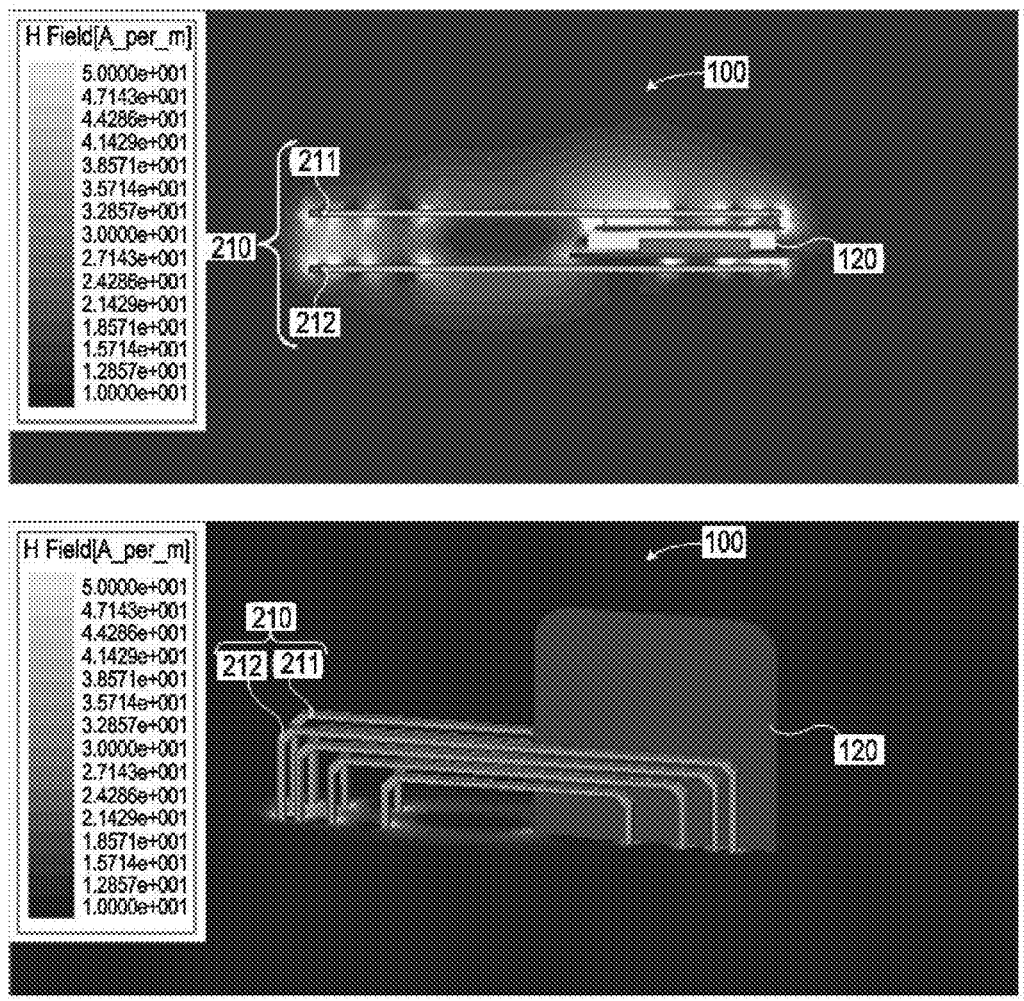
FIG. 4B is a view illustrating the distribution of the magnetic field generated by the various configurations of the structure of the transmitting coil, in which electric current flows in different directions in the transmitting coil.
Figure 4C:
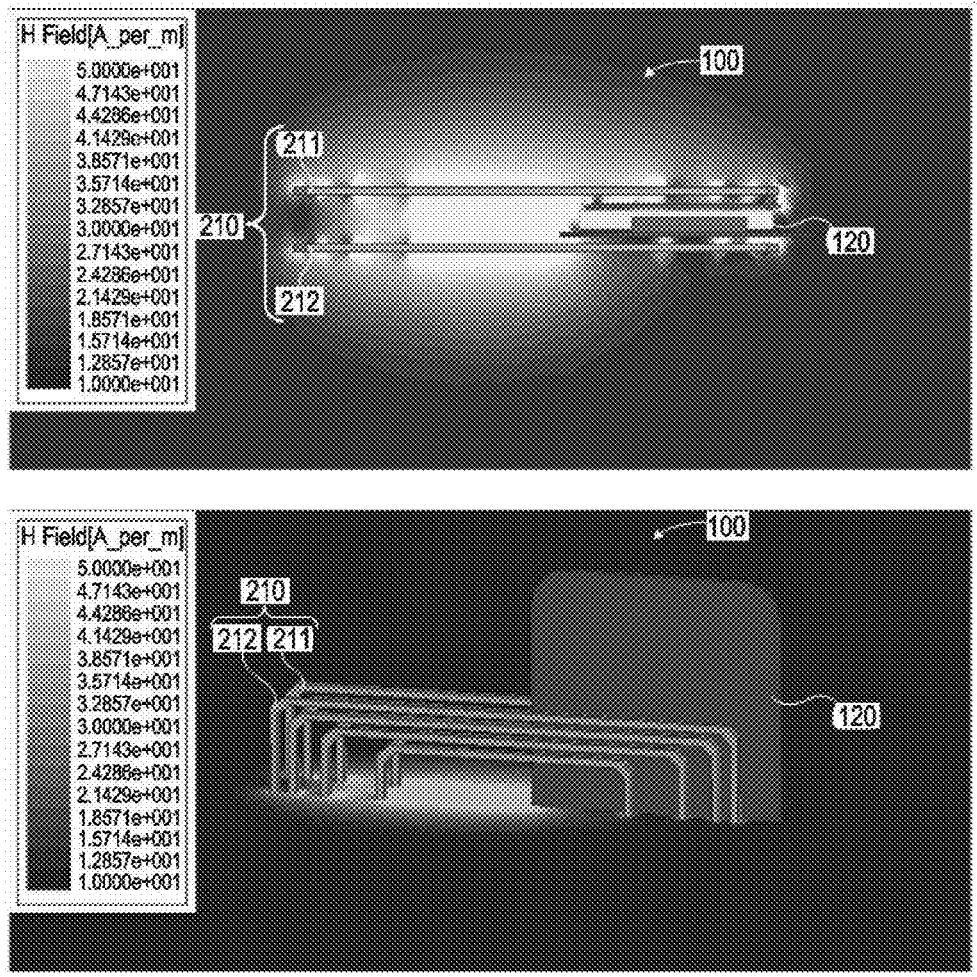
FIG. 4C is a view illustrating the distribution of the magnetic field generated by the various configurations of the structure of the transmitting coil, in which electric current flows in the same direction.

FIGS. 4A, 4B and 4C show examples of distribution of density of the magnetic field generated by various configurations of the structure of the transmitting coil 210. FIG. 4A shows an example of distribution of density of the magnetic field for a structure of the transmitting coil 210 located in an arrangement of a planar structure on a side of the device 120 for reception of energy. Such a structure of the transmitting coil 210 is most common in existing devices of a wireless transfer of energy, including multi-position wireless chargers.

FIG. 4B shows an example of distribution of density of the magnetic field for the structure of the transmitting coil 210, in which currents in the parts 211 and 212, located at both sides of the device 120 for reception of energy, flow in multi-directions. FIG. 4C shows an example of distribution of density of the magnetic field in the structure of the transmitting coil 210, in which currents in the parts 211 and 212, located at both sides of the device 120 for reception of energy, flow in co-directions. It is clear, as shown in FIG. 4C, that in case of multidirectional currents in the parts of 211 and 212 of structures of the transmitting coil 210, the magnetic field is weakened in area inside the charge cell 111 and outside its boundary, in which the amplitude of density of a magnetic stream is maximum between the device 120 for reception of energy and the part 211 of the structures of the transmitting coil 210.

In some embodiments, the charger 110 provides a larger number of charge cells 111, or may further provide other functions. For example, a basic version of the charger 110 can charge one device 120 for reception of energy. However, the charging of several devices 120 for reception of energy can be simultaneously implemented by adding a second module. Each module supports one or more charge cells formed by corresponding components, including a set of structures of transmitting coils 210 as the unit of electric power supplying circuit 310.

In several embodiments, the charger 110 is expandable for charging of various devices 120 for reception of energy with low or high energy consumption by connection of modules of various types. Some modules are optimized to support the charging of specific devices with the low or high energy consumption according to the configuration of a set of structures of transmitting coils 210.

According to the present invention, the charger 110 includes various additional functions, such as a switch or a touch pad, which is operated by a touch of a user, provided to the charger 110.

In some embodiments, a voice and/or visual output unit for informing the user of the status of devices 120 for reception of energy, time and status of the process of charging of the accumulator, incoming calls and messages, or other information is provided to the charger 110. Indication of the information from the devices 120 for reception of energy is implemented in the charger 110 by voice and/or visual method.

Some additional and optional capabilities of the charger maybe provided. In particular, a source of ultra-violet radiation may be embedded in the charger for disinfection of the charged device by destruction of microorganisms on a surface of the mobile device. Means of protection from environmental hazards or foreign substances such as a dust, high air humidity and moisture may be also embedded in the charger. Such protecting means may be implemented with a shield structure including the shield surface 131.

The wireless multi-position charge system of the present invention is implemented with the reconstructed matching of the load impedance and the electrical feed of a set of structures of the transmitting coils, providing generation of a magnetic stream in one or several cells of a charger.

The electromagnetic field is enclosed inside the system of wireless multi-position charging of mobile devices. Radiation in a long-range wave area is suppressed due to the design of the set of structures of transmitting coils. The system of the present invention solves the problem of electromagnetic compatibility and protects users against influence of electromagnetic radiation.

The claimed charger is intended for simultaneous charging of two or more electronic devices including cellular phones, smartphones, earphones, audio or video players, tablet PCs, electronic books and any other portable electronic devices, capable of consuming energy or to be charged by a wireless method.

The present invention has unique features in that it has a compact structure for simultaneous highly-effective charging of several devices for reception of energy, an uniform efficiency of a transfer of energy for various positions and orientations of devices for reception of energy, and the almost zero level of spurious electromagnetic radiation of resonators.

The wireless charging system according to the embodiments of the present invention has a small size and may simultaneously charge large number of devices for reception of energy while suppressing spurious radiation. With the wireless charging of the devices for reception of energy, the free orientation of the devices can be achieved and the even efficiency of the energy for the devices can be ensured.

While the present disclosure has been shown and described with reference to certain embodiments thereof, it will be understood by those skilled in the art that various changes in form and details may be made therein without departing from the spirit and scope of the present invention as defined by the appended claims.

What is claimed is:

1. A wireless charger for an electronic device, comprising:
one or more charge chambers, the one or more charge chambers including an opening receiving an electronic device and transmitting coils disposed adjacent to the opening; and
an electric power supply circuit supplying power to the transmitting coils,
wherein the transmitting coils at least partially enclose a circumference of the opening and are configured such that:
outside of the charge chambers, a magnetic field generated by one of the transmitting coils is subtracted or canceled by another magnetic field generated by another of the transmitting coils, and
inside the charge chambers, the magnetic fields generated by the one and the another of the transmitting coils are concentrated in the opening which the electronic device for reception of energy is located,
wherein the transmitting coils have a structure of charging and/or providing electrical power to each respective electronic device randomly and three-dimensionally oriented in each of the charge chambers, by generating the magnetic field, and
wherein distribution of the magnetic field is determined by secondary induced currents on metal surfaces of the electronic device according to a position and the three-dimensional orientation of the electronic device inside each of the charge chambers.

2. The wireless charger as in claim 1, wherein the electric power supply circuit performs a matching of an impedance of a set of the structure of the transmitting coils and distributes the electric power to the set of the structure of the transmitting coils, the electric power supply circuit including:
an electric power supply unit;
a radio frequency power generator which generates an alternative current, and supplies the electric power to an input of a matching unit of the transmitting coils;

the matching unit of the transmitting coils, which matches an impedance of outputs of the radio frequency power generator and each transmitting coil; and a switch which connects each matching unit of the transmitting coils with a corresponding structure of the transmitting coils.

3. The wireless charger as in claim 2, wherein outputs of the radio-frequency power generator are connected to inputs of the matching unit of the transmitting coils.

4. The wireless charger as in claim 1, wherein the electronic device comprises:

another electric power supply circuit receiving inductance coils corresponding to at least one of the transmitting coils, another matching unit providing a matching of impedance between the electronic device and an input of a rectifier;

the rectifier, of which an output is connected to an input of the another matching unit;

a feed regulator which executes a current regulation of the rectifier for providing a charging mode required to charge a rechargeable accumulator; and the rechargeable accumulator.

5. The wireless charger as in claim 1, further comprising an automatic detection device for detecting a presence or an absence of the electronic device in at least one of the charge chambers based on a status change of the electric power supply circuit of the transmitting coils or a sensor.

6. The wireless charger as in claim 1, wherein the wireless charger is connected with each electronic device for data transmission using a data transmission scheme including Radio Frequency Identification (RFID), Near Field Communication (NFC), Bluetooth, Bluetooth Low-Energy (BLE), Zig-Bee, 2.4 GHz Ant+or any other information transmission modes.

7. The wireless charger as in claim 6, wherein the wireless charger and each electronic device comprise at least one antenna, which transmits information about the presence of the electronic device, identification data thereof, and device charging requirements including a charging mode.

8. The wireless charger as in claim 7, wherein the at least one antenna includes a first antenna integrated with the transmitting coils, and a second antenna integrated with a receiving coil of each electronic device.

9. The wireless charger as in claim 1, further comprising a shield structure surrounding a set of the structure of the transmitting coils, the shield structure providing suppression of spurious radiation and an electromagnetic compatibility.

10. The wireless charger as in claim 9 wherein a surface of the shield structure includes a ferrite thin film, an artificial magnetic and conductive material, an electric and conductive material, and combinations thereof.

11. The wireless charger as in claim 9, wherein the shield structure protects the electronic device from foreign substances including dust and moisture.

12. The wireless charger as in claim 9, wherein a module supporting one or more charge chambers is connected to an additional module so as to simultaneously charge a large number of the electronic devices.

13. The wireless charger as in claim 12, wherein the connected modules support the charging of the electronic devices with different energy consumption capabilities.

14. The wireless charger as in claim 1, further comprising an ultra-violet radiation source in one or several charge chambers for disinfection of the electronic devices during wireless charging.

15. The wireless charger as in claim 1, further comprising an air humidity control equipment.

16. The wireless charger as in claim 1, further comprising a voice and/or visual output unit which provides a user with information including the status of each electronic device, time and status of the process of charging of an accumulator, and received calls and messages.

17. The wireless charger as in claim 1, further comprising at least one of a switch and a touch pad, wherein at least one of the switch and the touch pad is operated by a touch of a user.

* * * * *